US008660050B2

United States Patent
Kim et al.

(10) Patent No.: US 8,660,050 B2
(45) Date of Patent: Feb. 25, 2014

(54) METHOD AND APPARATUS FOR TRANSMITTING MBS DATA IN WIRELESS COMMUNICATION SYSTEM USING FRACTIONAL FREQUENCY REUSE

(75) Inventors: Dong Cheol Kim, Anyang-si (KR); Yeong Hyeon Kwon, Anyang-si (KR); Jin Sam Kwak, Anyang-si (KR); Sung Ho Moon, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 13/062,979

(22) PCT Filed: Oct. 15, 2009

(86) PCT No.: PCT/KR2009/005939
§ 371 (c)(1),
(2), (4) Date: Mar. 9, 2011

(87) PCT Pub. No.: WO2010/044621
PCT Pub. Date: Apr. 22, 2010

(65) Prior Publication Data
US 2011/0164547 A1    Jul. 7, 2011

Related U.S. Application Data

(60) Provisional application No. 61/105,800, filed on Oct. 15, 2008.

(51) Int. Cl.
*H04W 16/02* (2009.01)
(52) U.S. Cl.
USPC ........... 370/312; 370/208; 370/329; 370/330; 370/447; 455/436; 455/447; 455/452.1

(58) Field of Classification Search
USPC .......... 370/312, 329–330, 447, 208; 455/436, 455/447, 452.1
See application file for complete search history.

(56) References Cited

U.S. PATENT DOCUMENTS

| | | | |
|---|---|---|---|
| 6,768,714 B1* | 7/2004 | Heinonen et al. | 370/208 |
| 7,782,807 B2* | 8/2010 | Yoon et al. | 370/312 |
| 8,144,657 B2* | 3/2012 | Tao et al. | 370/329 |
| 2006/0014542 A1* | 1/2006 | Khandekar et al. | 455/447 |
| 2007/0049283 A1 | 3/2007 | Kim et al. | |
| 2007/0293229 A1* | 12/2007 | Khan | 455/450 |
| 2007/0297323 A1* | 12/2007 | Seki | 370/208 |
| 2008/0079574 A1* | 4/2008 | Soffer | 340/568.1 |
| 2008/0089312 A1* | 4/2008 | Malladi | 370/345 |
| 2009/0092059 A1* | 4/2009 | Fu | 370/252 |
| 2010/0254342 A1* | 10/2010 | Cho et al. | 370/330 |
| 2011/0211618 A1* | 9/2011 | Oyman et al. | 375/211 |

FOREIGN PATENT DOCUMENTS

WO    WO 2008/109568 A1    9/2008

* cited by examiner

*Primary Examiner* — Charles C Jiang
*Assistant Examiner* — Mohamed Kamara
(74) *Attorney, Agent, or Firm* — Birch, Stewart, Kolasch & Birch, LLP

(57) ABSTRACT

Provided are a method and an apparatus for transmitting multicast broadcast service (MBS) data in a wireless communication system using fractional frequency reuse (FFR). The method comprises: allocating, to a common network zone, part or whole of a frequency partition where FRF (frequency reuse factor) is 1, from among a plurality of frequency partitions; and transmitting MBS data in the common network zone.

5 Claims, 20 Drawing Sheets

METHOD AND APPARATUS FOR TRANSMITTING MBS DATA IN WIRELESS COMMUNICATION SYSTEM USING FRACTIONAL FREQUENCY REUSE

This application is a National Phase of PCT/KR2009/005939 filed on Oct. 15, 2009, which claims priority under 35 U.S.C. 119(e) to U.S. Provisional Application No. 61/105,800 filed on Oct. 15, 2008. The entire contents of the above applications are hereby incorporated by reference into the present application.

BACKGROUND OF THE INVENTION

1. Field of the Invention

The present invention relates to wireless communications, and more particularly, to a method and apparatus for transmitting multicast broadcast service (MBS) data in a wireless communication system using fractional frequency reuse (FFR).

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference. In a system using the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner.

An electrical and electronics engineers (IEEE) 802.16 wireless communication system provides a high-speed multimedia communication service to users in addition to the conventional voice and packet data communication services. The multimedia communication service is a service for transmitting data packets to a plurality of user equipments (UEs), and is referred to as various terms such as a broadcast/multicast service, a multimedia broadcast multicast service (MBMS), a multimedia and broadcast service (MBS), and a point-to-multipoint service. These terms are used without distinction in the following description. The MBS is based on Internet protocol (IP) multicast and allows UEs to receive the same multimedia data by sharing resources required for data packet transmission. Therefore, resource efficiency can be increased by the MBS.

The MBS can be classified into two types. The first type is a single-BS access type in which a service is provided by one BS in one cell. Examples of the first type include mobile TV, emergency alert, home network, corporate announcement, etc. The second type is a multi-BS access type in which several BSs provide an MBS service by creating one MBS zone. That is, the MBS service is provided in such a manner that the same burst is allocated from an MBS server in a plurality of cells in the same MBS zone by using one MBS zone identifier (ID). Therefore, service continuity and a macro-diversity gain can be obtained without a handover in case of inter-cell movement of cells including the BS.

There is a need for an effective resource allocation method for transmitting MBS data.

SUMMARY OF THE INVENTION

The present invention provides a method and apparatus for transmitting multicast broadcast service (MBS) data in a wireless communication system using fractional frequency reuse (FFR).

In an aspect, a method of transmitting multicast broadcast service (MBS) data in a wireless communication system using fractional frequency reuse (FFR) is provided. The method include allocating a part or whole of a frequency partition whose frequency reuse factor (FRF) is 1 to a network common zone among a plurality of frequency partitions, and transmitting the MBS data in the network common zone. The method may further include allocating a frequency region, which remains after allocating the network common zone in the frequency partition whose FRF is 1, to a unicast zone, and transmitting unicast data in the unicast zone. The network common zone and the unicast zone may be contiguous to each other in the frequency partition whose FRF is 1.

A plurality of guard subcarriers may be located between the network common zone and the unicast zone. The network common zone and the unicast zone may have cyclic prefixes (CPs) with different lengths. The network common zone may be deployed to an edge of the frequency partition whose FRF is 1. A plurality of contiguous subcarriers constituting the network common zone may be permutated on a subcarrier basis.

In another aspect, a transmitter in a wireless communication system using FFR is provided. The transmitter include a processor, and a radio frequency (RF) unit coupled to the processor, wherein the processor is configured to allocate a part or whole of a frequency partition whose frequency reuse factor (FRF) is 1 to a network common zone among a plurality of frequency partitions, and transmit multicast broadcast service (MBS) data in the network common zone.

According to the present invention, a multicast broadcast single frequency network (MBSFN) can be effectively supported when using fractional frequency reuse (FFR).

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16m.

Figure 1:
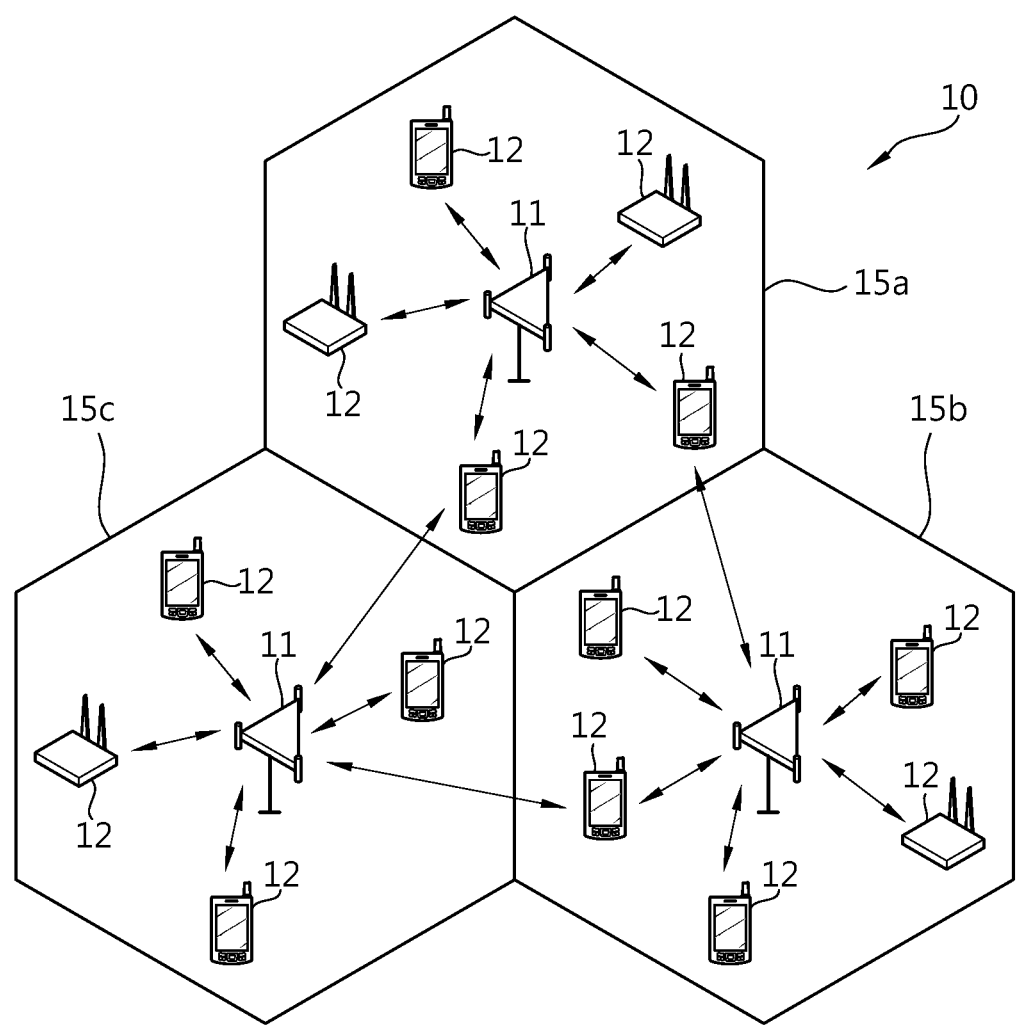
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. Although one BS can provide a communication service to one or more cells, it is assumed hereinafter that one BS provides the communication service to one cell. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. The BS 11 is generally a fixed station that communicates with the UE 12 and may be referred to as another terminology, such as an evolved node-B (eNB), a base transceiver system (BTS), an access point, an access network (AN), etc.

A UE belongs to one cell. A cell to which the UE belongs is referred to as a serving cell. A BS providing a communication service to the serving cell is referred to as a serving BS. Since a wireless communication system is a cellular system, there is another cell adjacent to the serving cell. The cell adjacent to the serving cell is referred to as a neighbor cell. A BS providing a communication service to the neighbor cell is referred to as a neighbor BS. The serving cell and the neighbor cell are determined relatively with respect to the UE.

This technique can be used for a downlink or an uplink. In general, the downlink denotes communication from the BS 11 to the UE 12, and the uplink denotes communication from the UE 12 to the BS 11. In the downlink, a transmitter may be a part of the BS 11, and a receiver may be a part of the UE 12. In the uplink, the transmitter may be a part of the UE 12, and the receiver may be a part of the BS 11.

Figure 2:
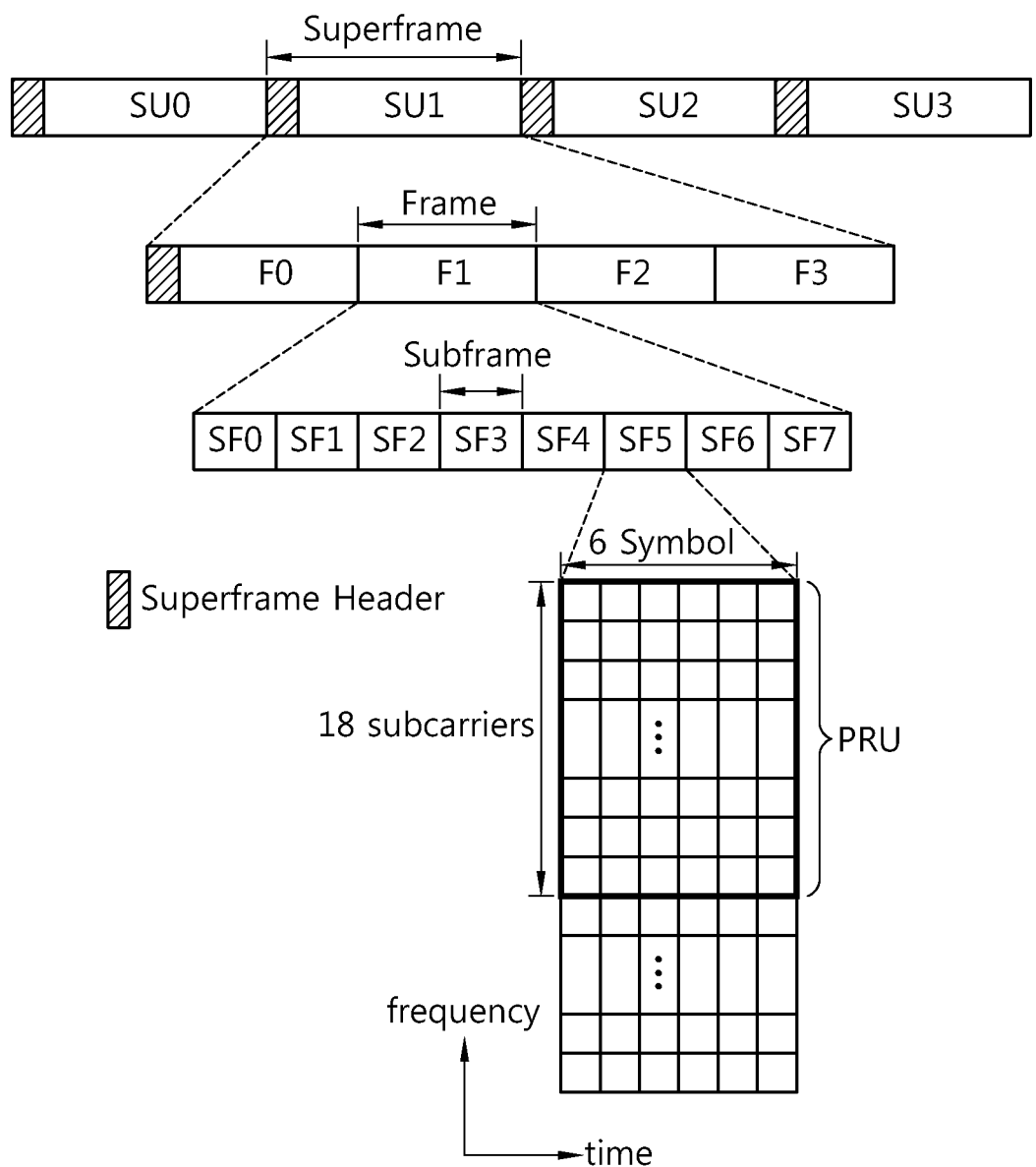
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. For example, the SF may have a size of 20 milliseconds (ms), and each frame may have a size of 5 ms. A length of the SF, the number of frames included in the SF, the number of subframes included in the frame, etc., may change variously. The number of SFs included in the frame may change variously according to a channel bandwidth and a cyclic prefix (CP) length.

The SFH may carry an essential system parameter and system configuration information. The SFH may be located in a first subframe of the SF. The SFH may be classified into a primary-SFH (P-SFH) and a secondary-SFH (S-SFH). The P-SFH and the S-SFH may be transmitted in every SF.

One frame includes a plurality of subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol represents one symbol period, and can be referred to as other terminologies such as an OFDMA symbol, an SC-FDMA symbol, etc., according to a multiple access scheme. Although it is described herein that one subframe includes 5, 6, 7, or 9 OFDM symbols, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

One OFDM symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDM symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time. A subcarrier spacing $\Delta f$ is $F_S/N_{FFT}$, a useful symbol time $T_b$ is $1/\Delta$, a CP time $T_g$ is $G \cdot T_b$, an OFDMA symbol time $T_S$ is $T_b+T_g$, and a sampling time is $T_b/N_{FFT}$.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission can be simultaneously performed while occupying different frequency bands.

The subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU may be determined according to a subframe type. For example, when one subframe consists of 6 OFDM symbols, the PRU may be defined with 18 subcarriers and 6 OFDM symbols.

The IEEE 802.16m system supports an enhanced multicast broadcast service (E-MBS). The E-MBS is a point-to-multipoint system in which data packets are simultaneously transmitted from one source to a plurality of destinations. Broadcast implies capability for transmitting contents to all users. Multicast implies capability for transmitting contents to a specific group of users registered to receive a specific service. Static multicast and dynamic multicast can be supported.

E-MBS contents are transmitted in an E-MBS zone. The E-MBS zone is a set of at least one advanced base station (ABS) that transmits the same E-MBS contents. The E-MBS contents are identified by the same identifier (ID). Each ABS capable of providing the E-MBS service may belong to one or more E-MBS zones, and when the ABSs belong to different E-MBS zones, different services can be provided respectively. Each E-MBS zone is identified by a unique E-MBS zone ID.

Figure 3:
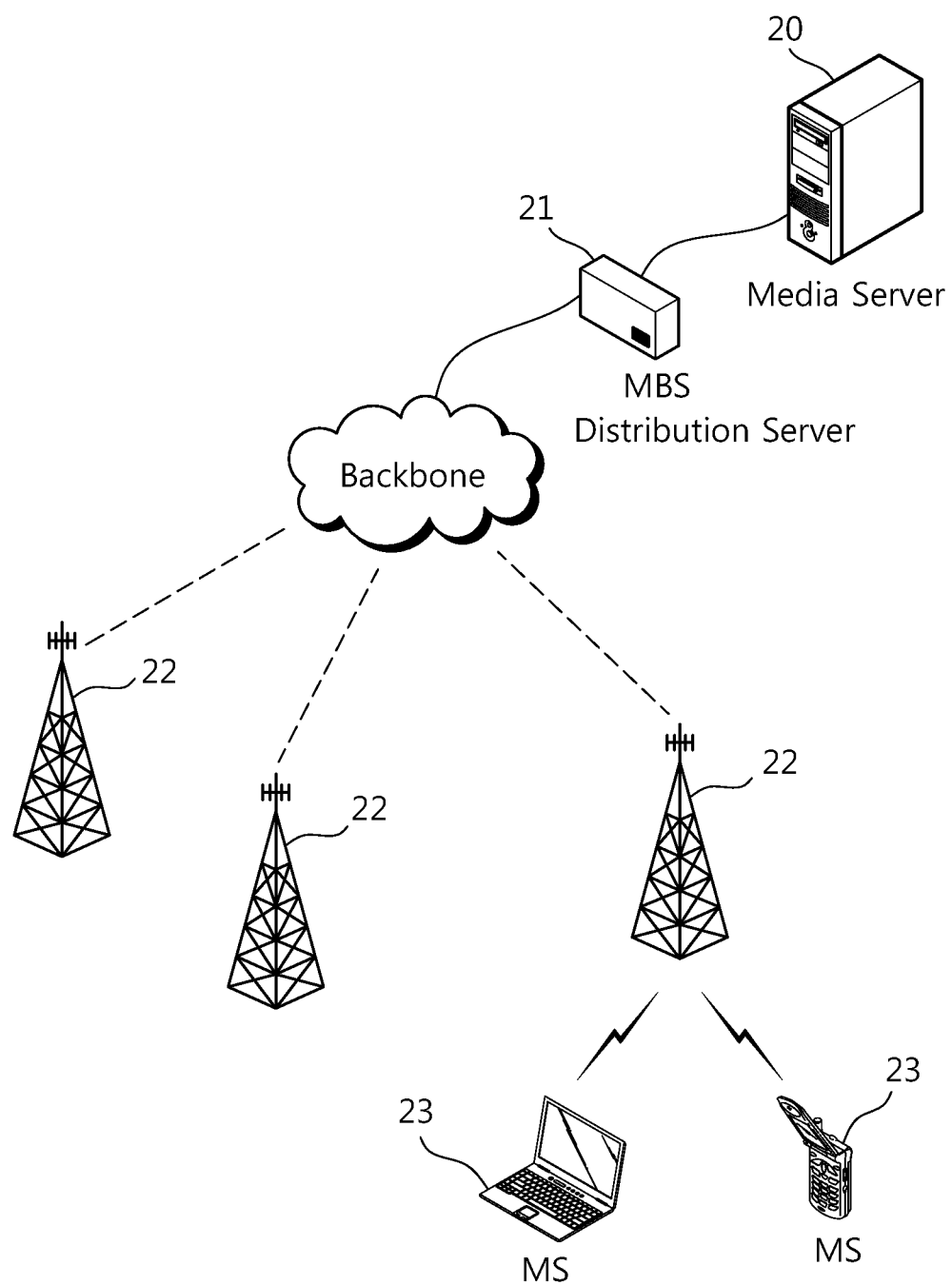
FIG. 3 shows an example of a reference model for an E-MBS of a broadband wireless communication system.

FIG. 3 shows an example of a reference model for an E-MBS of a broadband wireless communication system.

Referring to FIG. 3, an E-MBS network includes an MBS media server 20, an MBS distribution server 21, one or more BSs 22, and one or more MSs 23. The MBS media server 20 provides MBS data to the BSs 22, and performs MS authentication and encryption key distribution with respect to MBS contents. The MBS distribution server 21 takes charge of scheduling of the MBS data delivered to the BSs 22. The BS 22s provide the MBS data delivered through a backbone network to the MSs 23 through a radio interface, and the MSs 23 receive the MBS data from the BSs 22. Optionally, the MBS distribution server 21 may be omitted, and the MBS media server 20 may perform the scheduling of the MBS data. Alternatively, the MBS distribution server 21 may be omitted, and one of the BSs 22 may perform the scheduling of the MBS data.

The MBS of the broadband wireless communication system may have the following characteristics.

1) Minimization of power consumption: The MS can minimize power consumption while receiving the MBS data irrespective of a current operation mode (e.g., a normal operation mode, a sleep mode, and an idle mode).
2) Mobility: The MS can be provided with a seamless MBS connection even if the MS moves between the BSs.
3) MBS zone: The MBS contents are transmitted using an MBS zone divided regionally, and MBS configuration information (e.g., an MBS connection ID, an encryption key, a service ID, etc.) can be configured differently between different MBS zones.
4) Security: The MBS contents are delivered only to authorized users. The encryption key for a MAC PDU of MBS data can be equally applied between the BSs in the MBS zone.

Hereinafter, the MBS zone will be described.

MBS related parameters (e.g., a security key, a multicast connection ID, etc.) may be configured differently according to a region, and the MBS contents may be broadcast only in a limited zone. Therefore, when the MS moves to another BS or performs a handover while receiving the MBS contents, the MS has to determine whether the stored MBS information is valid and whether the MBS contents can be persistently received.

If the BS provides the MBS by using a parameter different from the MBS information stored in the MS or does not transmit the MBS contents, the MS has to access to a new BS in order to update the parameter for the IVIES contents. To solve this problem, the broadband wireless communication system manages the MBS zone in which one or more BSs providing the MBS are grouped.

The BSs in the same MBS zone transmit the MBS contents to the MSs by using the same MBS parameter. In addition, the BS delivers an MBS zone ID to the MS so that the MS can recognize the MBS zone. The MS can immediately determine whether the currently stored MBS parameter is valid by using the MBS zone ID received from the BS.

Further, if the MS moves to another BS in the same MBS zone, there is no need to perform a process of reconfiguring the MBS related parameter to receive the MBS data. Furthermore, the BSs in the same MBS zone transmit the MBS data at the same time by using the same radio resource, and thus MBS data reception efficiency can be increased by using a macro-diversity effect.

Figure 4:
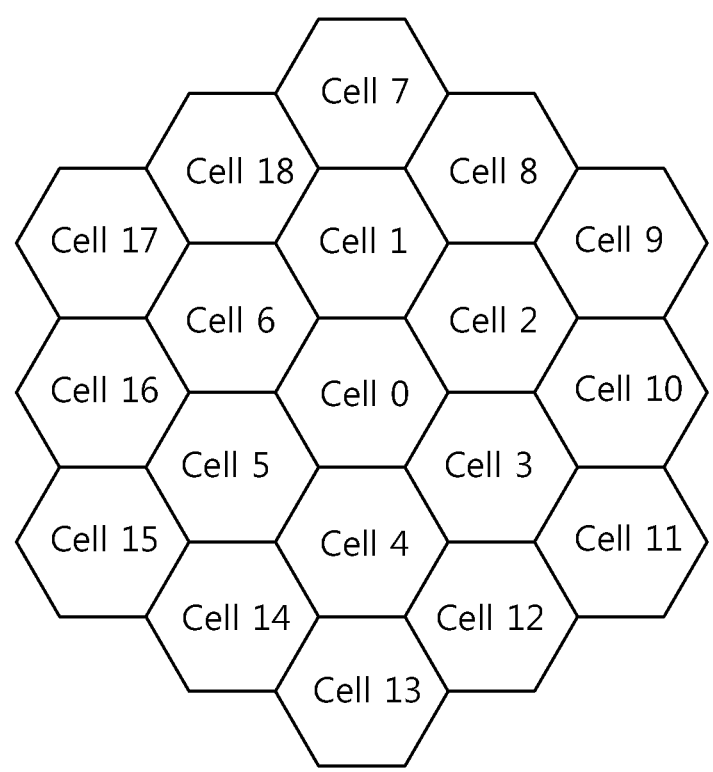
FIG. 4 shows an example of a multicast broadcast single frequency network (MBSFN) zone.

FIG. 4 shows an example of a multicast broadcast single frequency network (MBSFN) zone. The MBSFN may indicate a macro-diversity operation mode.

Referring to FIG. 4, an MBS zone to which a single frequency network (SFN) is applied is shown for example. An operation of the SFN can be performed when a plurality of cells having a timing error in a cyclic prefix (CP) range transmit the same data at the same time by using the same transmission mechanism (e.g., a symbol, a sub-channel, the same frame number, a modulation scheme, etc.). Data transmission between BSs in the MBS zone is synchronized in a symbol level which ensures macro diversity based on signal combination and high cell edge performance.

Meanwhile, the MBSFN zone consists of 19 cells, i.e., cells 0 to 18. However, the present invention is not limited thereto, and thus the number of cells constituting the MBSFN zone may be greater than or less than 19. In addition, the MBSFN zone can be configured in several combinations.

Fractional frequency reuse (FFR) implies the use of an assigned bandwidth in such a manner that the bandwidth is split by using different reuse factors. The FFR can be used when separate radio resources belonging to different zones are intended to be used for a particular purpose. For example, in order to increase throughput in a cell edge in one cell, a part of the bandwidth may be allocated to a cell edge portion by splitting the bandwidth.

Figure 5:
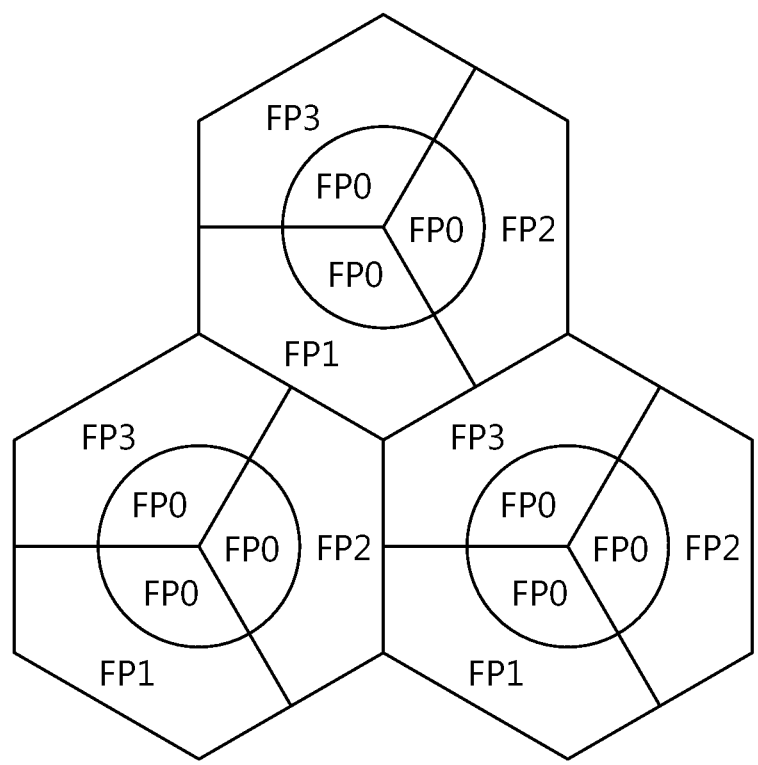
FIG. 5 shows an example of a cellular system using an FFR scheme.

FIG. 5 shows an example of a cellular system using an FFR scheme.

Referring to FIG. 5, each cell is divided into an inner cell and a cell edge. Further, each cell is divided into three sectors. It is assumed that a full frequency band is divided into three FPs (i.e., FP1, FP2, and FP3), and a first FP (i.e., FP0) consists of a second FP (i.e., FP1), a third PF (i.e., FP2), and a fourth FP (i.e., FP3). That is, the first FP (i.e., FP0) is identical to the full frequency band.

The first FP (i.e., FP0) is allocated in the inner cell. Any one of the second FP (i.e., FP1) to the fourth FP (i.e., FP3) is allocated in each sector of the cell edge. In this case, different FPs are allocated between neighbor cells. Hereinafter, an allocated FP is referred to as an active FP, and an unallocated FP is referred to as an inactive FP. For example, when the second FP (i.e., FP1) is allocated, the second FP is an active FP, and the third FP (i.e., FP2) and the fourth FP (i.e., FP3) are inactive FPs.

A frequency reuse factor (FRF) can be defined as the number of cells (or sectors) into which the full frequency band can be divided. In this case, the FRF may be 1 in the inner cell, and may be ⅓ in each sector of the cell edge.

The FFR has two types, i.e., a hard FFR and a soft FFR. The hard FFR uses only an active zone without using an inactive zone. The soft FFR uses the inactive zone as well, by allocating a specific resource to the inactive zone. Since the hard FFR does not use a certain part of resources, resource utilization is low, but inter-frequency interference tends to decrease to that extent. Since the soft FFR uses a full band, resource utilization is high, but a method of effectively using the inactive zone is required.

Figure 6:
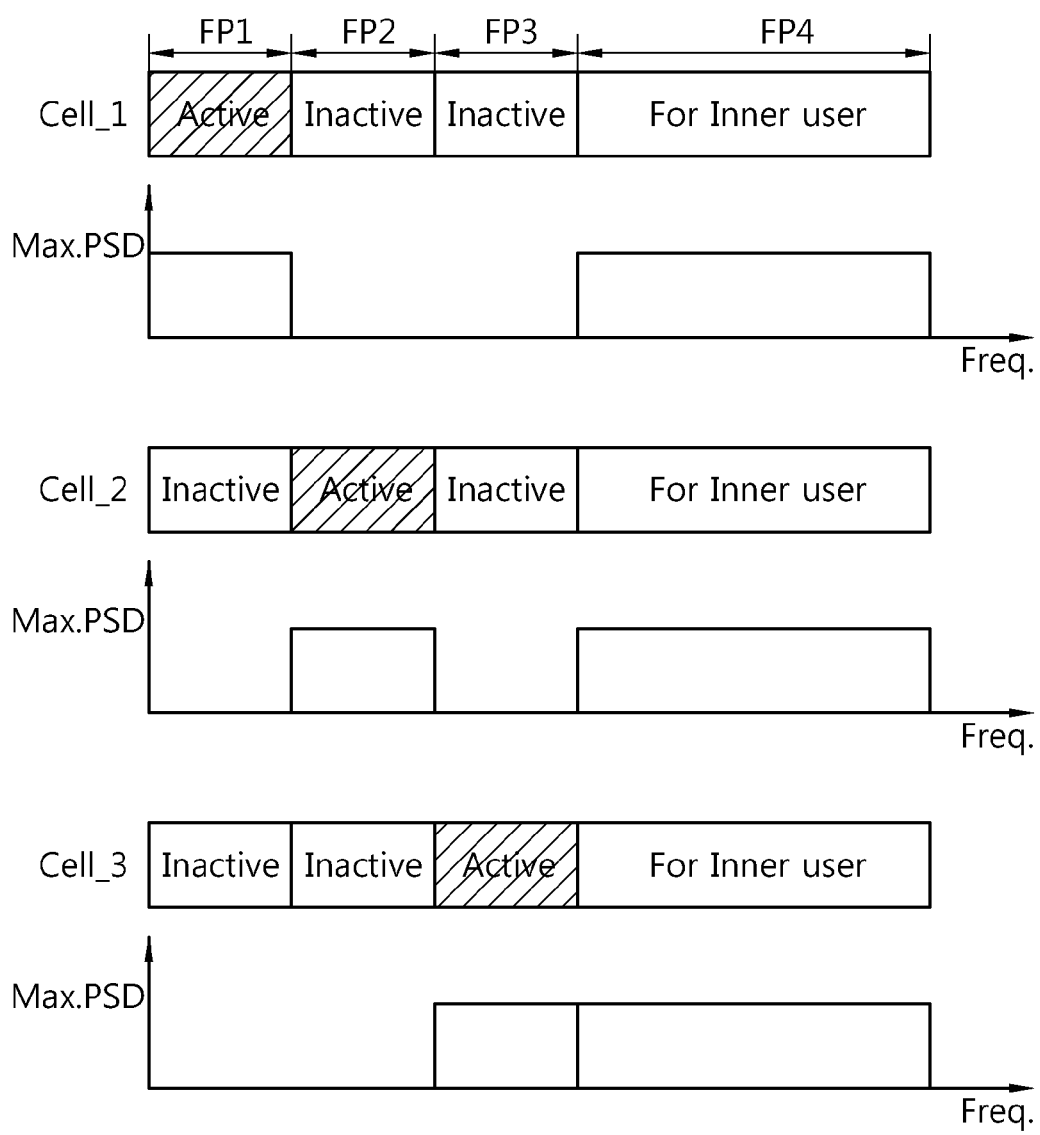
FIG. 6 shows an example of a resource zone using a hard FFR.

FIG. 6 shows an example of a resource zone using a hard FFR. The resource zone is divided into four zones according to a frequency. A zone F4 occupies a wider frequency region than those of zones F1 to F3. However, the present invention is not limited thereto, and thus resources allocated to each zone may have a fixed or variable size. When the frequency region is divided into four zones, the zone F4 is generally called a reuse-1 zone, and the zones F1 to F3 are called reuse-⅓ zones.

Referring to FIG. 6, the zone F4 corresponds to a common zone used in all cells 1 to 3. In addition, except for the zone F4, only the zone F1 is allocated to an active zone in the cell 1, and is allocated to an inactive zone in the cell 2 and the cell 3. Likewise, the zone F2 is allocated to an active zone only in the cell 2, and the zone F3 is allocated to an active zone only in the cell 3. Therefore, it can be seen that a resource is allocated only to an active zone of each cell. A power resource is also allocated only to the active zone and the common zone.

Figure 7:
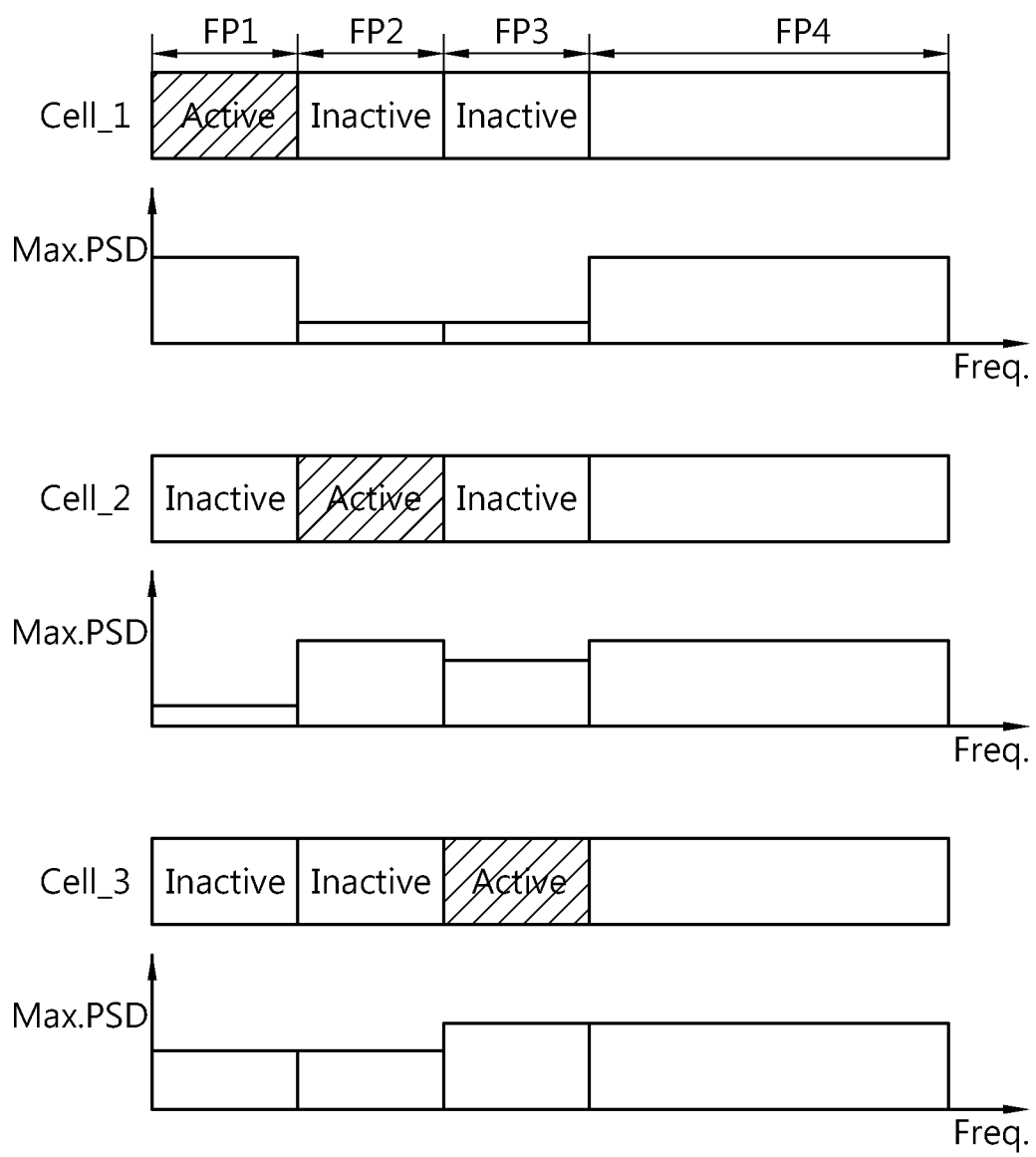
FIG. 7 shows an example of a resource zone using a soft FFR.

FIG. 7 shows an example of a resource zone using a soft FFR. Referring to FIG. 7, although it is the same structure as the example of FIG. 6, a radio resource and a power resource are allocated even in an inactive zone of each cell since the soft FFR is used.

An IEEE 802.16m system supports data multiplexing in a mixed carrier by using a multiplexing scheme such as time division multiplexing (TDM), frequency division multiplexing (FDM), or the like. When MBS data and unicast data are time-division multiplexed, the MBS data and the unicast data are transmitted in different subframes. When the MBS data and the unicast data are frequency-division multiplexed, all PRUs whose basic unit is $N_2$ PRUs are divided into two parts. One part is for the MBS data, and the other part is for the unicast data. After the multiplexing, sub-channelization is independently performed for the MBS data and the unicast data.

Figure 8:
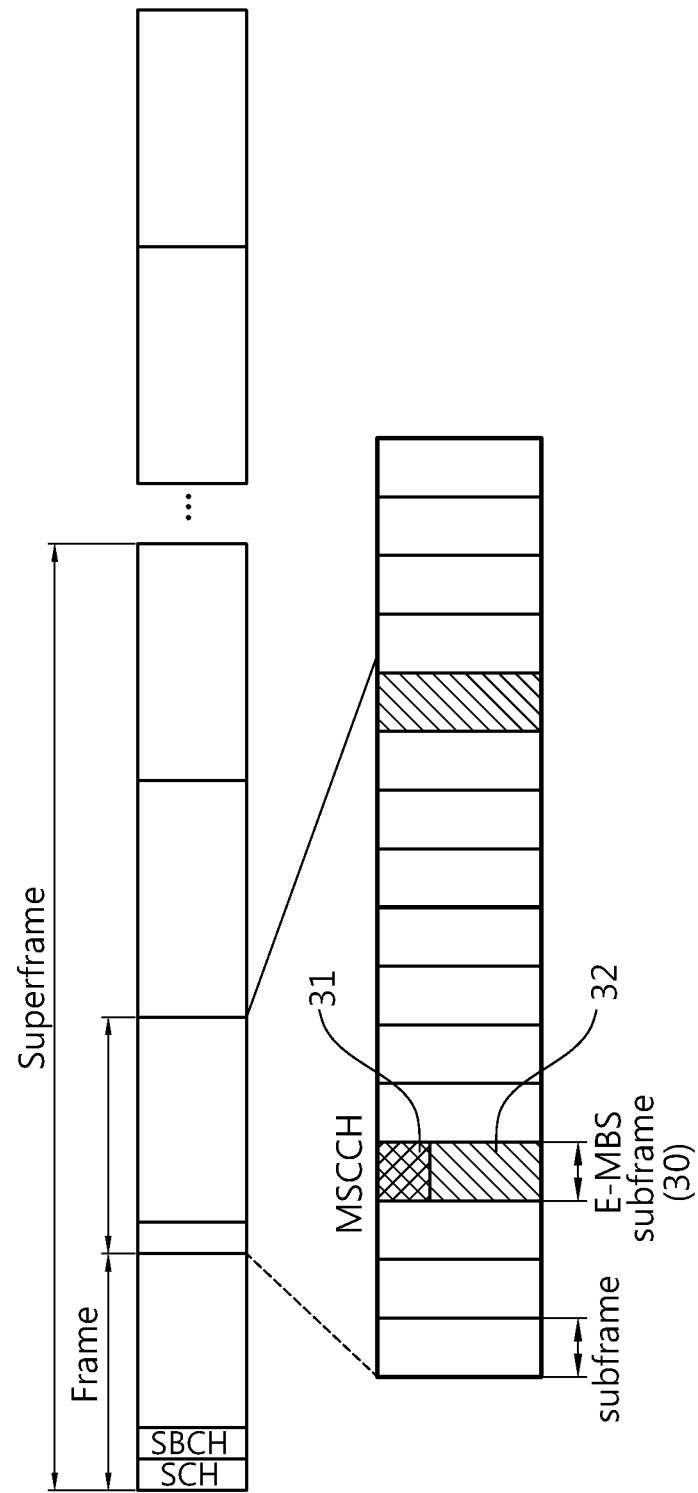
FIG. 8 shows an example of a frame structure when a mixed carrier is used and an E-MBS subframe exists in a superframe.

FIG. 8 shows an example of a frame structure when a mixed carrier is used and an E-MBS subframe exists in a superframe.

Referring to FIG. 8, an E-MBS subframe 30 is allocated at a specific position of a frame constituting the superframe. The E-MBS subframe can be classified into a multicast service control channel (MSCCH) for transmitting control information for an MBS and a data channel for transmitting data. When the mixed carrier is used, the E-MBS uses the same frame structure as a unicast carrier. When the superframe includes an E-MBS subframe, the E-MBS subframe is allocated with a fixed pattern in the superframe. The pattern may change from one superframe to another.

When a BS transmits downlink data to a UE in an MBSFN zone, MBS data and unicast data can be frequency-division multiplexed. Accordingly, there is a need for a method of allocating and using a resource zone.

Hereinafter, the proposed MBS data transmission method will be described according to an embodiment of the present invention.

Figure 9:
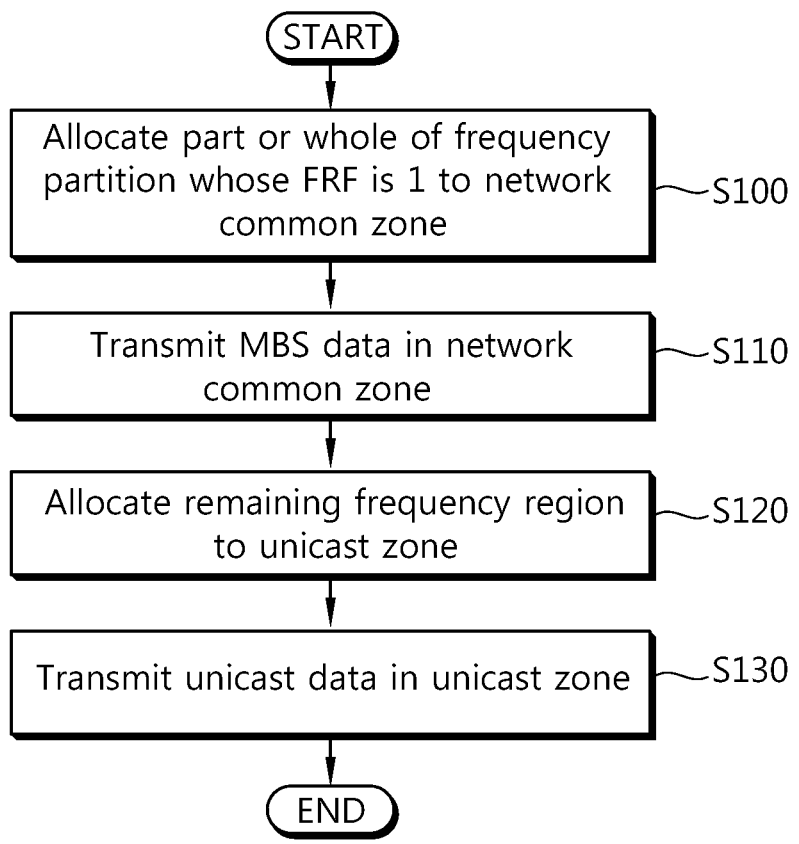
FIG. 9 shows an embodiment of the proposed MBS data transmission method.

FIG. 9 shows an embodiment of the proposed MBS data transmission method.

In step S100, a transmitter allocates a part or whole of a frequency partition whose frequency reuse factor (FRF) is 1 to a network common zone among a plurality of frequency partitions.

The plurality of frequency partitions can be divided into four zones F1 to F4 according to a frequency. The zone F4 occupies a wider frequency region than the zones F1 to F3. However, the present invention is not limited thereto, and thus a resource allocated to each zone may have a fixed or variable size. The zone F4 may be a reuse-1 zone, and the zones F1 to F3 may be reuse-⅓ zones. The frequency partition whose FRF is 1 may be the zone F4 which is the reuse-1 zone, and the remaining partitions may be the zones F1 to F3 which are the reuse-⅓ zones. In addition, the network common zone is a zone on a radio resource for transmitting MBS data. A resource allocated to the network common zone may have a fixed size or a size that changes periodically or non-periodically in a MBSFN zone. In addition, the resources allocated to the network common zone may be contiguous in the zone F4, or may be distributed by permutation performed on a subcarrier basis.

In step S110, the transmitter transmits the MBS data in the network common zone. Therefore, the MBS data may be transmitted using a part of the F4 zone, or may be transmitted using a whole of the F4 zone.

In step S120, the transmitter allocates a frequency region, which remains after allocating the network common zone in the frequency partition whose FRF is 1, to a unicast zone.

In step S130, the transmitter transmits unicast data in the unicast zone.

Figure 10:
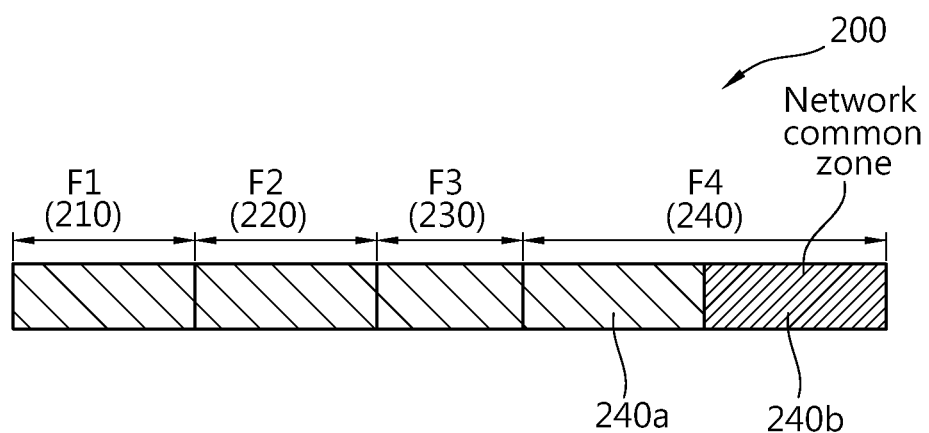
FIG. 10 shows an exemplary configuration of a frequency region according to the MBS data transmission method of FIG. 9.

FIG. 10 shows an exemplary configuration of a frequency region according to the AMS data transmission method of FIG. 9.

Referring to FIG. 10, a full frequency region 200 is divided into four frequency partitions. F1 to F3 zones 210, 220, and 230 are zones whose FRF is ⅓, and an F4 zone 240 is a zone whose FRF is 1. The F4 zone 240 is divided into a unicast zone 240a and a network common zone 240b. The unicast data is transmitted on the unicast zone 240a of the F1 to F3 zones 210, 220, and 230 and the F4 zone 240. MBS data is transmitted on the network common zone 240b of the F4 zone 240. Accordingly, the network common zone 240b on which the MBS data is transmitted can be disjointed from the zones 210, 220, 230, and 240a on which the unicast data is transmitted.

Figure 11:
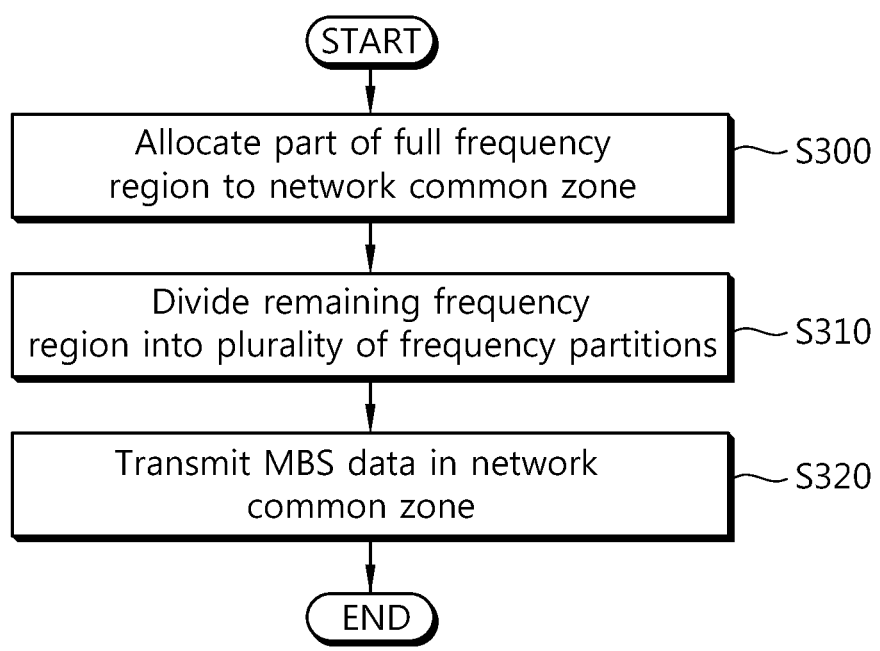
FIG. 11 shows another embodiment of the proposed MBS data transmission method.

FIG. 11 shows another embodiment of the proposed MBS data transmission method.

Referring to FIG. 11, in step S300, a transmitter allocates a part of a full frequency region to a network common zone on which MBS data is transmitted. A resource allocated to the network common zone may have a fixed size or a size that changes periodically or non-periodically in an MBSFN zone.

In step S310, the transmitter divides a frequency region, which remains after allocating the network common zone in the full frequency region, into a plurality of frequency partitions. Unicast data is transmitted through some of the plurality of frequency partitions. Accordingly, the network common zone on which MBS data is transmitted can be disjointed from a zone on which unicast data is transmitted.

In step S320, the transmitter transmits the MBS data in the network common zone.

Figure 12:
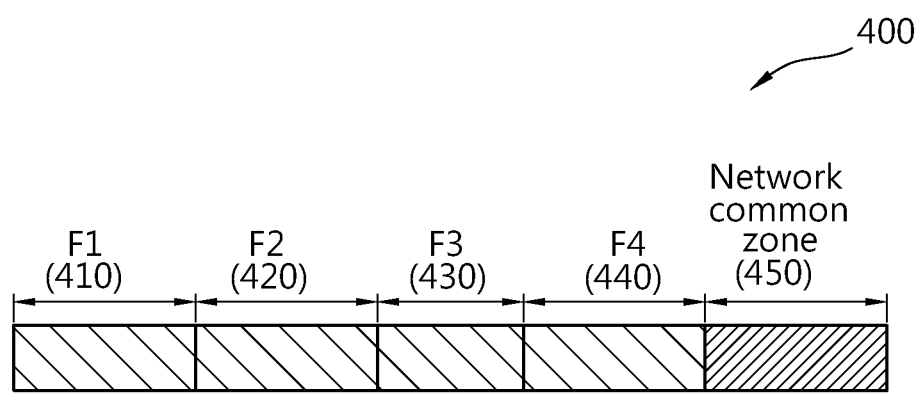
FIG. 12 shows an exemplary configuration of a frequency region according to the MBS data transmission method of FIG. 11.

FIG. 12 shows an exemplary configuration of a frequency region according to the MBS data transmission method of FIG. 11.

Referring to FIG. 12, a full frequency region 400 is divided into FFR zones 410, 420, 430, and 440 and a network common zone 450. The FFR zones 410, 420, 430, and 440 respectively correspond to F1 to F4 zones. The F1 to F3 zones 410, 420, and 430 are zones whose FRF is ⅓, and the F4 zone 440 is a zone whose FRF is 1. Unicast data is transmitted on the FFR zones 410, 420, 430, and 440. MBS data is transmitted on the network common zone 450. Accordingly, the network common zone on which IVIES data is transmitted can be disjointed from a zone on which unicast data is transmitted.

Meanwhile, a radio resource zone allocated to transmit the MBS data and the unicast data may have different CPs. An MBSFN zone on which the MBS data is transmitted is wider than an area of a cell in which the unicast data is transmitted. In general, a unicast data resource zone uses a frame structure having a CP with G=⅛ or 1/16. When an MBS data resource zone has the same CP as the unicast data resource zone, a service cannot be sufficiently supported for a wider zone. Therefore, the MBS data resource zone needs to use a frame structure having a longer CP. The MBS data resource zone may have a CP with G=¼. A guard band or a guard subcarrier is required between parts having different CPs on the radio resource zone.

Figure 13:
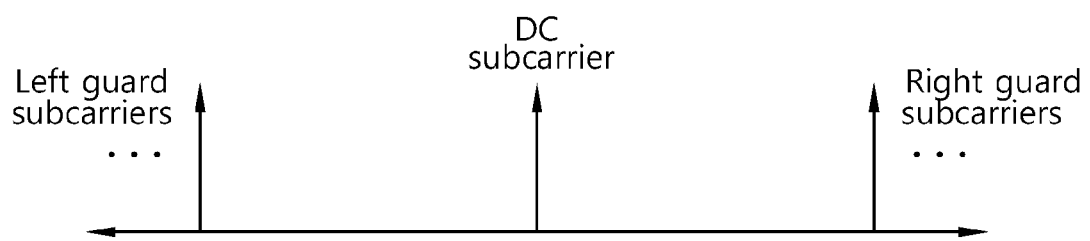
FIG. 13 shows a typical frequency region configured by using a guard subcarrier.

FIG. 13 shows a typical frequency region configured by using a guard subcarrier. Referring to FIG. 13, a left system guard subcarrier zone and a right system guard subcarrier zone are located to the left and right sides of a full available frequency region, and an inner frequency region between them is used as a resource zone. The resource zone for data transmission can be divided into a plurality of frequency partitions by the use of FFR. Various methods can be used when the resource zone is divided into the frequency partitions. That is, a group of contiguous subcarriers may be allocated to one frequency partition. Subcarriers may be selected according to a specific interval or a specific rule and the selected subcarriers may be combined with a specific size and then be allocated to one frequency partition. Alternatively, one frequency partition may be configured by using a method of selecting and combining subcarriers according to a specific rule in a divided zone after splitting the resource zone by combining contiguous subcarriers.

Figure 14:
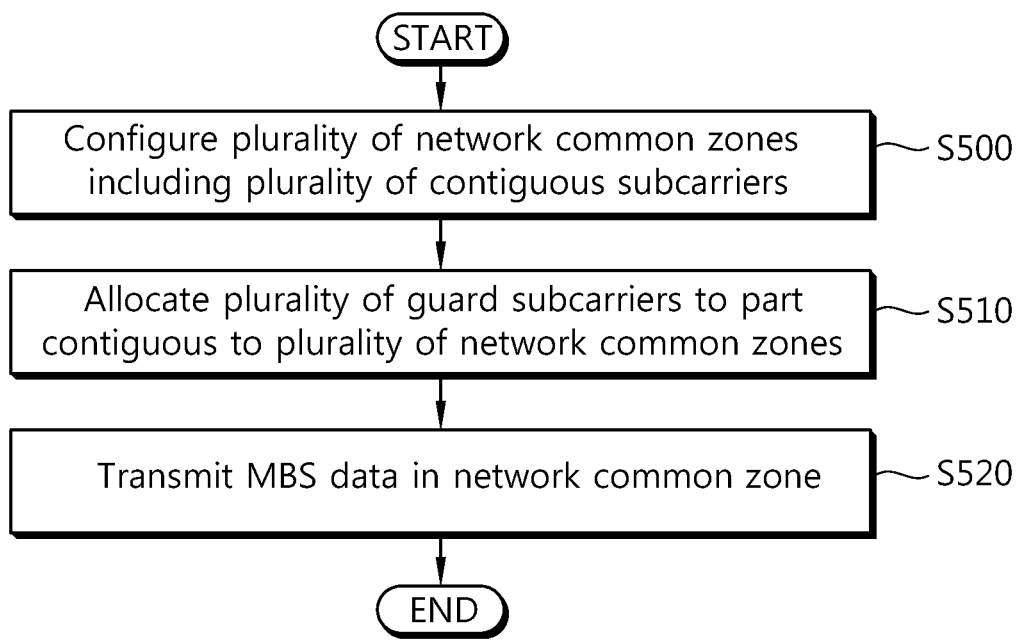
FIG. 14 shows another embodiment of the proposed MBS data transmission method.

FIG. 14 shows another embodiment of the proposed MBS data transmission method.

In step S500, a transmitter allocates a plurality of network common zones including a plurality of contiguous subcarriers on a frequency region including a plurality of system guard subcarriers.

In step S510, the transmitter allocates a plurality of guard subcarriers to one side or both sides of positions contiguous to the plurality of network common zones on the frequency region.

In step S520, the transmitter transmits MBS data in the network common zone.

Figure 15:
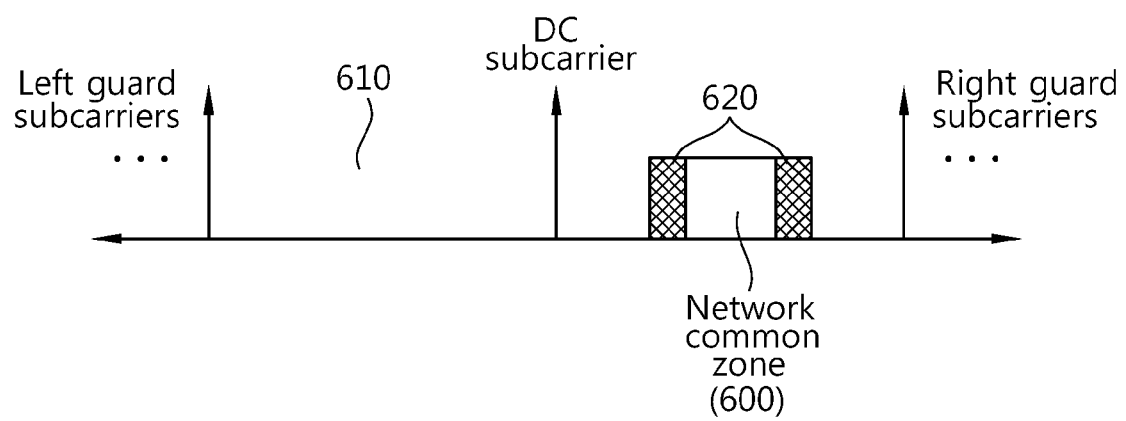
FIG. 15 shows an exemplary configuration of a frequency region according to the proposed MBS data transmission method.

FIG. 15 shows an exemplary configuration of a frequency region according to the proposed MBS data transmission method. Referring to FIG. 15, a network common zone 600 for MBS data transmission is allocated contiguously on a frequency region. In addition, in order to distinguish the network common zone 600 from a unicast data resource zone 610, a guard subcarrier 620 is allocated to both sides of the network common zone 600. A zone excluding the network common zone 600 and the guard subcarrier 620 corresponds to the unicast data resource zone 610. The network common zone 600 does not have a fixed position on a radio resource zone. When subcarriers constituting the network common zone 600 are contiguous to one another as described above, a size of resources allocated to the guard subcarrier can be minimized.

Figure 16:
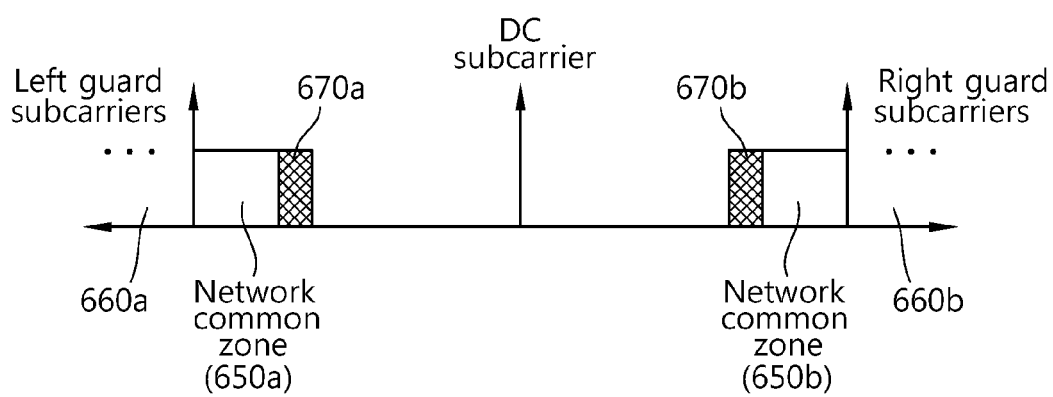
FIG. 16 shows another exemplary configuration of a frequency region according to the proposed MBS data transmission method.

FIG. 16 shows another exemplary configuration of a frequency region according to the proposed MBS data transmission method. In this case, the network common zone is divided into two parts unlike in FIG. 16. Referring to FIG. 16, network common zones 650a and 650b for MBS data transmission are allocated by being divided into two parts on a frequency region. The left network common zone 650a is contiguous to a left system guard subcarrier 660a at a left edge of the left network common zone. The right network common zone 650b is contiguous to a right system guard subcarrier 660b at a right edge of the right network common zone. A right edge of the left network common zone 650a and a left edge of the right network common zone 650b are not contiguous to the left or right system guard subcarriers 660a and 660b, and are contiguous to secondary guard subcarriers 670a and 670b. A zone excluding the network common zones 650a and 650b and the secondary guard subcarriers 670a and 670b from the full resource zone corresponds to a unicast data resource zone 680. Since the network common zones 550a and 550*b* are allocated by being divided into two parts to use the system guard subcarriers 560*a* and 560*b*, a resource size of the guard subcarrier can be decreased by half with respect to a size of the same common network.

Figure 17:
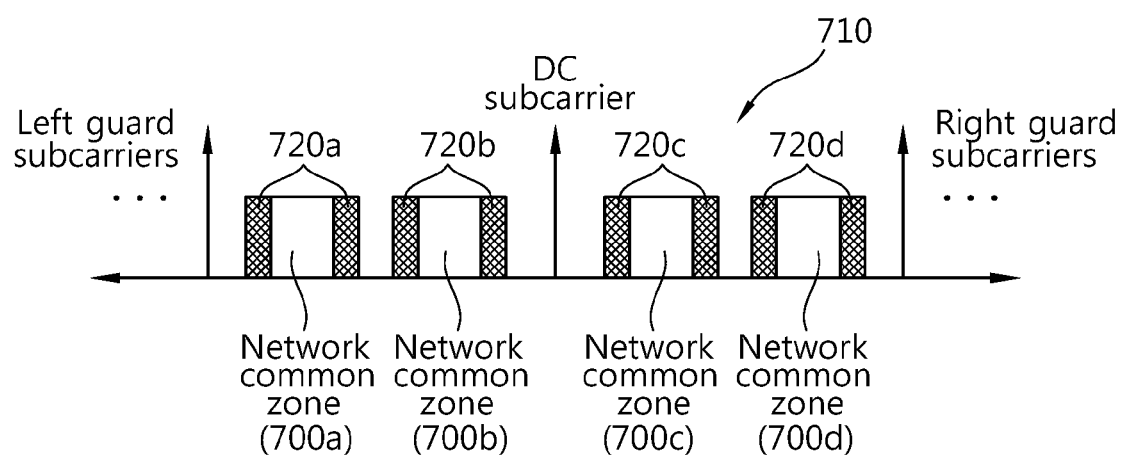
FIG. 17 shows another exemplary configuration of a frequency region according to the proposed MBS data transmission method.

FIG. 17 shows another exemplary configuration of a frequency region according to the proposed MBS data transmission method. Referring to FIG. 17, network common zones 700*a*, 700*b*, 700*c*, and 700*d* for MBS data transmission are allocated in a divisive manner on a frequency region. In addition, in order to distinguish the network common zones 700*a*, 700*b*, 700*c*, and 700*d* from a unicast data resource zone 710, guard subcarriers 720*a*, 720*b*, and 720*c*, and 720*d* are allocated to both sides of the network common zones 700*a*, 700*b*, 700*c*, and 700*d*. A zone excluding the network common zones 700*a*, 700*b*, 700*c*, and 700*d* and the guard subcarriers 720*a*, 720*b*, and 720*c*, 720*d* corresponds to the unicast data resource zone 710. The network common zones 700*a*, 700*b*, 700*c*, and 700*d* do not have a fixed position on a radio resource zone. When the network common zone is configured by combining contiguous subcarriers on a smaller unit basis described above, the number of guard subcarriers increases in comparison with the example of FIG. 15 or FIG. 16, but a spectral diversity gain can be obtained to that extent.

Figure 18:
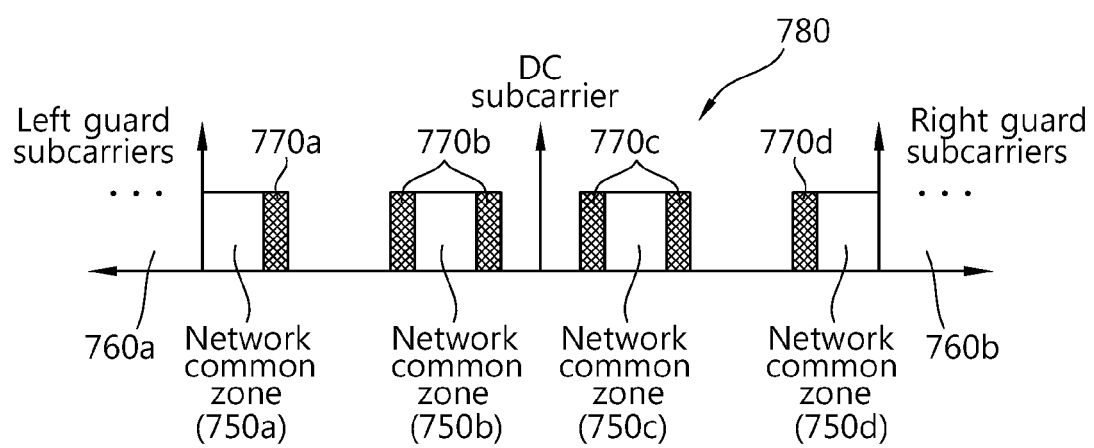
FIG. 18 shows another exemplary configuration of a frequency region according to the proposed MBS data transmission method.

FIG. 18 shows another exemplary configuration of a frequency region according to the proposed MBS data transmission method. Referring to FIG. 18, network common zones 750*a*, 750*b*, 750*c*, and 750*d* for MBS data transmission are allocated in a divisive manner on a frequency region. The first network common zone 750*a* is contiguous to a left system guard subcarrier 760*a* at a left edge of the first network common zone 750*a*. The fourth network common zone 750*d* is contiguous to a right system guard subcarrier 760*b* at a right edge of the fourth network common zone 750*d*. A right edge of the first network common zone 750*a* and a left edge of the fourth network common zone 750*b* are not contiguous to the left or right system guard subcarriers 760*a* and 760*b*, and are respectively contiguous to secondary guard subcarriers 770*a*, 770*b*, 770*c*, and 770*d* at edges of both sides of the second network common zone 750*b* and the third network common zone 750*c*. A zone excluding the network common zones 750*a*, 750*b*, 750*c*, and 750*d* and the secondary guard subcarriers 770*a*, 770*b*, 770*c*, and 770*d* from the full resource zone corresponds to a unicast data resource zone 780.

The subcarrier can be inner-permutated in the network common zone consisting of a set of contiguous subcarriers as shown in the example of FIG. 15 to FIG. 18. The permutation can be performed according to a specific rule. A spectral diversity gain can be obtained by using the permutation. In addition, if it is possible to determine whether to transmit MBS data optionally, a network common zone for MBS data can be used as a resource for unicast data when the MBS data is not used. In this case, the permutation for the network common zone may follow permutation of a unicast data resource zone. In addition, when the guard subcarrier is configured as described above, if a distributed resource unit (DRU) is used as the network common zone, a throughput loss of a system is caused since a plurality of guard subcarriers are configured. Therefore, in the above case, a contiguous resource unit (CRU) is suitable for a resource allocated to the network common zone.

The proposed invention can be used not only for a case of using a single carrier but also for a case of using multiple carriers.

Figure 19:
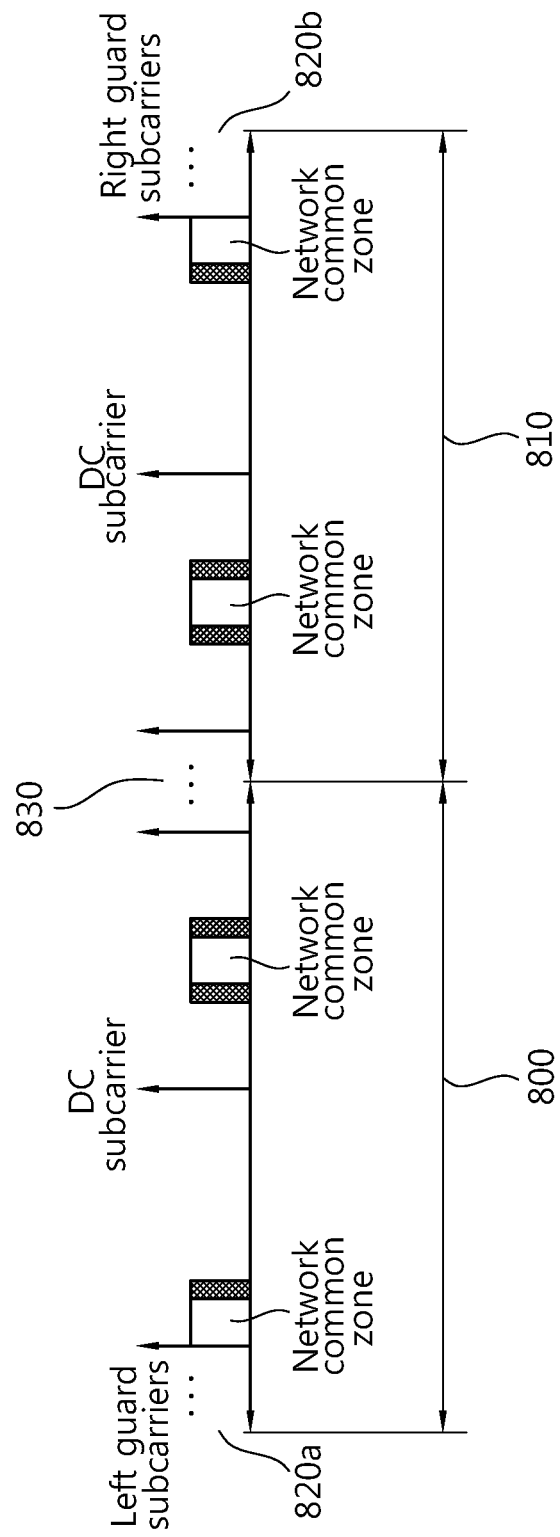
FIG. 19 shows another exemplary configuration of a frequency region according to the proposed MBS data transmission method.

FIG. 19 shows another exemplary configuration of a frequency region according to the proposed MBS data transmission method. Referring to FIG. 19, two carriers of an F0 zone 800 and an F1 zone 810 are contiguous to each other. As a system guard subcarrier 820, a left system guard subcarrier 820*a* exists at a left edge of the F0 zone 800, and a right system guard subcarrier 820*b* exists at a right edge of the F1 zone 810. No system guard subcarrier is allocated at a edge contiguous to an intermediate part 830 between two contiguous carriers. Therefore, if the network common zone is contiguous to the intermediate part 830, there is no need to allocate the guard subcarrier to the edge thereof. If the respective carriers are not contiguous on a frequency region, the frequency region configuration in the single carrier of FIG. 15 to FIG. 18 can be applied in each carrier.

Meanwhile, the embodiment of FIG. 14 or the example of the frequency region configuration of FIG. 15 to FIG. 18 can be combined with the embodiment of FIG. 9 and the example of the frequency region configuration of FIG. 10.

Figure 20:
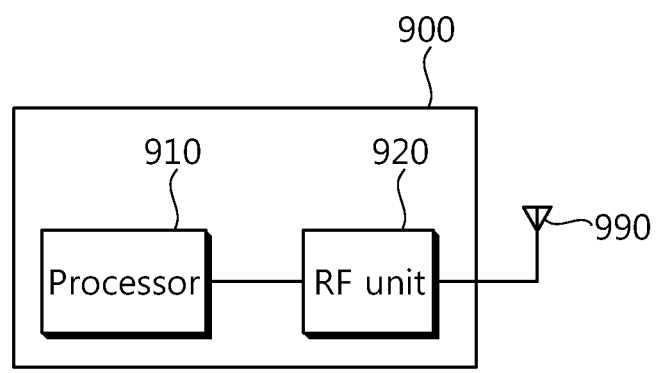
FIG. 20 is a block diagram showing a transmitter according to an embodiment of the present invention.

FIG. 20 is a block diagram showing a transmitter according to an embodiment of the present invention.

A transmitter 900 includes a processor 910 and a radio frequency (RF) unit 920. The processor 910 implements the proposed function, procedures, and/or methods.

The processor 910 allocates a part or whole of a frequency partition whose FRF is 1 to a network common zone among a plurality of frequency partitions, and transmits MBS data in the network common zone. The RF unit 920 is coupled to the processor 910, and transmits and/or receives a radio signal.

The processor 910 may include an application-specific integrated circuit (ASIC), a separate chipset, a logic circuit, and/or a data processing unit. The RF unit 920 may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor 910.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications, and changes should fall within the spirit and scope of the claims of the present invention.

What is claimed is:

1. A method of transmitting multicast broadcast service (MBS) data in a wireless communication system using fractional frequency reuse (FFR), the method comprising:

allocating a first network common zone, which includes a plurality of contiguous subcarriers and corresponds to radio resources for transmitting MBS data, at a left edge of a full available frequency region, wherein a left edge of the first network common zone is contiguous to left system guard subcarriers, and a right edge of the first network common zone is contiguous to first guard subcarriers;

allocating a second network common zone, which includes a plurality of contiguous subcarriers and corresponding radio resources for transmitting MBS data, at a right edge of the full available frequency region, wherein a right edge of the second network common zone is contiguous to right system guard subcarriers, and a left edge of the second network common zone is contiguous to second guard subcarriers; and transmitting the MBS data through at least one of the first network common zone and the second network common zone.

2. The method of claim 1, further comprising:

allocating a plurality of unicast zones, which remain after allocating the first and the second network common zones; and transmitting unicast data in at least one unicast zone of the plurality of unicast zones.

3. The method of claim 2, wherein the first and the second network common zones and each unicast zone of the plurality of unicast zones have cyclic prefixes (CPs) with different lengths.

4. The method of claim 1, wherein the plurality of contiguous subcarriers constituting the first and the second network common zones is permutated on a subcarrier basis.

5. A transmitter in a wireless communication system using fractional frequency resource (FFR), the transmitter comprising:

a processor; and a radio frequency (RF) unit coupled to the processor, wherein the processor is configured to:

allocate a first network common zone, which includes a plurality of contiguous subcarriers and corresponds to radio resources for transmitting MBS data, at a left edge of a full available frequency region, wherein a left edge of the first network common zone is contiguous to left system guard subcarriers, and a right edge of the first network common zone is contiguous to first guard subcarriers;

allocate a second network common zone, which includes a plurality of contiguous subcarriers and corresponding radio resources for transmitting MBS data, at a right edge of the full available frequency region, wherein a right edge of the second network common zone is contiguous to right system guard subcarriers, and a left edge of the second network common zone is contiguous to second guard subcarriers; and transmit multicast broadcast service (MBS) data through at least one of the first network common zone and the second network common zone.

* * * * *